United States Patent [19]

Born

[11] Patent Number: 4,927,706

[45] Date of Patent: May 22, 1990

[54] POST FORMING SEMI-FINISHED PRODUCT FOR THE MANUFACTURE OF MOULDED PARTS RESISTANT TO BENDING

[75] Inventor: Eberhard Born, Cologne, Fed. Rep. of Germany

[73] Assignee: Bayer Aktiengesellschaft, Fed. Rep. of Germany

[21] Appl. No.: 155,981

[22] Filed: Feb. 16, 1988

[30] Foreign Application Priority Data

Feb. 26, 1987 [DE] Fed. Rep. of Germany ....... 3706227

[51] Int. Cl.$^5$ ............................................... B32B 3/26
[52] U.S. Cl. ............................. 428/304.4; 428/313.3; 428/313.5; 428/316.6

[58] Field of Search .................. 428/316.6, 68, 69, 70, 428/71, 234, 235, 313.3, 313.6, 304.4, 316.6

[56] References Cited

U.S. PATENT DOCUMENTS

| | | | |
|---|---|---|---|
| 3,626,044 | 12/1971 | Arnaud | 428/316.6 |
| 4,473,608 | 9/1984 | Grundmann | 428/71 |
| 4,495,235 | 1/1985 | Tesch | 428/234 |

Primary Examiner—William J. Van Balen
Attorney, Agent, or Firm—Connolly & Hutz

[57] ABSTRACT

A semi-finished product (24) composed of dry, loose covering layers (10, 15) of reinforcing material and a debris material (9) of reaction resin (5) and elements (7) of variable form and volume as core (22) is used for the manufacture of moulded parts by hot pressing.

7 Claims, 1 Drawing Sheet

POST FORMING SEMI-FINISHED PRODUCT FOR THE MANUFACTURE OF MOULDED PARTS RESISTANT TO BENDING

This invention relates to a post forming semi-finished product, in particular with sheet-like dimensions, for the manufacture of flexurally rigid moulded parts comprising flexible covering layers of dry reinforcing mats with open spaces extending in the direction of the core which contains resin and to a process for its manufacture.

Structural parts of plastics material are nowadays frequently manufactured as sandwich structures in order to obtain optimum results by a combination of the advantageous properties of the different materials.

A FRM (foam reservoir moulding) process is known, in which a dry fibrous reinforcement, a foam impregnated with epoxy resin and another dry fibrous reinforcement are placed one after another into a mould. When the mould is closed the fibrous reinforcement moves relatively to the foam and is pressed against the wall of the mould by the foam, and air can escape through the fibrous reinforcement until the latter becomes filled with the epoxy resin due to the continued compression of the foam.

This process has the disadvantage that introduction of the materials into the mould is complicated and creases are liable to form in the fibrous reinforcement especially when it extends over a large area. Another disadvantage is that the distribution of the synthetic resin in the core is very uneven as it depends to a large extent on the deformation of the foam which cannot shift out of position and hence on the volume of pores in the foam.

Prepregs are known in which the reinforcing layers are impregnated with resin from the start.

Such compact prepregs have the disadvantage that when there are pronounced curvatures in the wall of the mould, the necessary sliding movement of the prepreg is made difficult by the impregnation with resin which extends right to the upper surface with the result that the mould does not become completely filled, and the reinforcing layers are liable to be accidentally displaced.

It is an object of the present invention to provide a semi-finished product which is built up of plastics materials and is stable in storage and flexible under post forming conditions for the manufacture of lightweight, rigid moulded products, including a process for producing the same.

The semi-finished product should have a sheet-like or a three-dimensional form, depending on the subsequent purpose for which it is intended, this outer form being obtainable directly or, for example, by cutting, sawing, punching or drilling materials in the form of webs or plates.

The semi-finished product should be readily mouldable even after a prolonged storage time and should have a surface which readily adapts to the contours of the mould under post forming conditions to produce the finished moulded article.

The semi-finished product should be optimally constructed in every part thereof for the static and dynamic requirements.

Manufacturers who have previously only worked with sheet metal should be able to use the semi-finished product without any special chemical knowledge to shape and fix it in their usual hot presses or post forming apparatus to produce a rigid moulded part with flawless surface in a single operational step with as little handling as possible.

To solve this problem according to the invention, fixed debris composed of individual three-dimensional elements variable in space, volume and/or form and reaction resin is arranged as core between the covering layers which are spaced apart.

It is surprising that a semi-finished product based on plastics for post forming into a moulded product can be produced with minimum material stress in spite of its high degree of deformation and can be converted in known hot presses into lightweight, rigid, flat or multi-dimensionally bent moulded articles which hitherto could only be obtained economically from sheet metal. This is possible because owing to the provision according to the invention of a heap of debris between the covering layers which adapt to the contour of the mould in the moulding process, the only displacement which occurs is a relative displacement between the individual elements, and this is facilitated by the reaction resin present, which has a viscosity of from 500 to 10,000 mPa.s. On further compression of the heap of debris (1:2 to 1:20), some of the resin escapes from the filled gaps between the elements into the spaces in the loose covering layers due to the pressure gradient. A finished moulded product with a lightweight core of a resin structure which is capable of bearing loads owing to the advantageous pore structure and an outer compact layer of plastics on each side reinforced with reinforcing mat constituting a proportion of 30 to 70% by weight, in particular from 40 to 60% by weight is thus obtained without the material stresses normally produced by such a moulding process.

The semi-finished product according to the invention permits degrees of deformation, which are a measure of the ratio of projection to development of from 5 to 35%, in particular from 12 to 25%, and variations in thicknesses of 1:20, for example with wall thicknesses of up to 30 mm, with a maximum (deformative) inclination of the flanks of up to 85°.

The proportion of resin in the debris part of the semi-finished product should be from 1/10 to 1/100 parts by volume, in particular from 1/20 to 1/60 parts by volume of the elements. The structural viscosity of the reaction resin during manufacture of the semi-finished product should be less than 10,000 mPa.s and is preferably in the region of from 500 to 1600 mPa.s and should subsequently increase rapidly to 20,000 mPa.s or more to prevent separation of the components during storage or handling of the semi-finished product.

The dimensions of the semi-finished product are preserved by bonding the outer covering layers together.

Rigid spacers may be produced by forming a bonding bridge in the reaction resin by means of localised heating by a high frequency field or laser beams preferably making use of a sintering effect. A debris material in which the elements are coated with resin is particularly suitable for such purposes.

For flexible spacers, it is suitable to use fibres or filaments which establish the bond between the outer covering layers by stitching or interweaving.

Lastly, shrink films may be applied to the outside as spacers which not only provide mechanical protection but also reduce evaporation and reaction of the resin with air.

The covering layers preferably consist of fibres. filaments threads or wires based on glass, carbon, aramide or metal and may be joined together in the form of woven fabrics, networks, knitted fabrics, layers or nonwoven fleeces. Reinforcing layers which have a compact surface on the outside and depressions extending in the direction of the core with a total surface of evolution greater than 1.5 times the front surface could also be used.

The covering layers enable the semi-finished product to be arranged in such a manner that every part of the finished product subsequently obtained contains exactly the reinforcement optimally adapted to the static requirements.

Furthermore, the thickness of the outer, compact plastics layer may be modified by loose reinforcing additions (non-woven webs) as these may provide spaces available for the reaction resin. Such a measure may increase the protection against outer mechanical influences and improve the surface.

Lastly, the core may be reinforced by the addition of fibre shavings, hollow beads, solid beads and/or flakes. These reinforcements are strangely found to align themselves along the walls of the elements in the resin bed and thus reinforce the walls of the pores which has the effect inter alia of considerably improving the shearing strength of the core.

The elements used may be organic or inorganic predominantly elastic elements which are compressible or expansible under the action of heat and/or pressure and/or can change their form at least under the action of outside forces. In particular, the elements should be capable of at least partly evaporating under the action of heat so that the gas produced, if suitable, may advantageously be used to accelerate curing of the resin in the finished moulded product.

The elements may have any form or shape but are preferably spheres with diameters of 2 to 8 mm or 3 to 5 mm or symmetrical polyhedrons. With optimum distribution, the first mentioned may have an interspace volume of about 25% which may be reduced to 10% by additional particle sizes.

Partly or completely prefoamed or expanded beads of synthetic materials such as polyethylene, polystyrene, polypropylene or polyurethane or natural materials such as cereal grains with unit weights from 20 to 50 kg/m$^3$ may be used as special materials.

The liquid reaction resin systems used in the semifinished products preferably have a structural viscosity of from 600 to 3000 during the process of mixing the debris material. This viscosity is sufficient to ensure good distribution without destruction of sensitive elements and without wetting covering layers of glass fibres. Another advantage is the slow reaction of the resin under certain storage conditions so that the goods may be temporarily stored (for 1 to 3 months) if necessary without coming to any harm. At the same time when the finished product is produced in the hot press, if necessary with the addition of a gas or application of a high frequency field, curing is completed within a few minutes so that the product can be removed from the mould within a short time.

Another possible method of introducing the reaction resin into the debris consists of introducing a pulverulent reaction resin system along the surface of the elements by means of a separate adhesive which is flexible when hot. This has the advantage that there will be virtually no premature reaction since the components are separated.

Polyester, epoxy, resorcinol polyurethane and phenol formaldehyde resins and mixtures of these resins, e.g. mixtures of polyester and epoxy resins have been found to be suitable reaction resins.

The problem according to the invention is further solved by a process according to the invention for producing the semi-finished product claimed. In this process, a heated debris material which has previously been prepared by mixing a reaction resin with elements which are changeable in volume or shape in a mixer in proportions of from 1/10 to 1/100, in particular from ) 1/20 to 1/60, is applied as core to the lower flexible covering layer, and after application of the upper flexible covering layer and calibration, a bond is established between the two covering layers.

With the installation employed, it is possible to place a debris material composed of resin systems with a structural viscosity of from 600 to 3000 mPa.s and lightweight elements between two open, flexible covering layers in such a manner that no separation of the components takes place during insertion of the debris material or during storage or subsequent mechanical processing such as cutting, punching or sawing. At the same time, when the semi-finished product is subsequently to be post formed into the finished product, it can be rendered so flexible by only a slight supply of heat that it is capable of a high degree of deformation of from 5 to 45% and a compression of from 1:2 to 1:6 without damage to the weight bearing material. Furthermore, the strength profile of the moulded part to be subsequently obtained can be determined in advance by varying the degrees of freedom in the semi-finished product, namely the quantity or nature of the resin system, the size, volumetric change and form of the elements and the structure and material of the reinforcement.

It is advantageous to compress the debris material to a considerable extent by vibration. Its cohesiveness is thereby improved and the flow of reaction resin into the covering layers during the final process is facilitated since the distance to be travelled by the resin is reduced and there is less infiltrated air to be displaced.

Complete coating of the elements with reaction resin ensures uniform distribution which not only results in good bonding in the debris material but also provides uniform production conditions for optimum construction of the core during subsequent processing.

The uniform application of a powder of a reaction resin system, which may consist of several separate components. to the surface of an element by means of a flexible layer of adhesive has the advantage that no reactions take place in the resin until it melts in the final process.

The bonding together of the two covering layers and optionally also bonding of the elements may be carried out in certain areas by radiant heat which is preferably supplied only in the quantity required to enable the individual particles of reaction resin to sinter together to bring about a slight preliminary reaction.

Mechanically bonding the two covering layers together by means of filaments is expensive but very secure..

BRIEF DESCRIPTION OF THE DRAWING

An example of the invention is illustrated in the drawing and described below. The drawing represents a flow chart of the production of semi-finished products.

The feedpipe 3 from the containers 4 for components 5a and 5b of the reaction resin 5 and for the reinforcing additives 6 and the elements 7 open into the hopper 1 of the mixer 2. The outlet opening 8 of the mixer 2 is situated above a lower covering layer 10 which has previously been drawn off a supply roll 11 of reinforcing material and is now carried horizontally over deflecting rollers and supporting rollers 12,13. Offset from the outlet opening 8 of the mixer 2 in the direction of transport, an upper covering layer 15 is supplied from above over a calibrating roller 14. This upper covering layer 15 may be a double layer obtained, for example, by passing a reinforcing material from a supply roll 16 and a fleece from a supply roll 17 together over a deflecting roller 18. This arrangement of rollers is followed by a stitching device 19 with filaments 20 which serve as spacers 21 for the covering layers 10,15 on either side of the core 22, and by a length cutting device 23. The semi-finished product 24 is cut up into boards 25 which prior to being carried away are stacked on a table 27 which is hydraulically adjustable in height by a piston 26.

Figure 1:
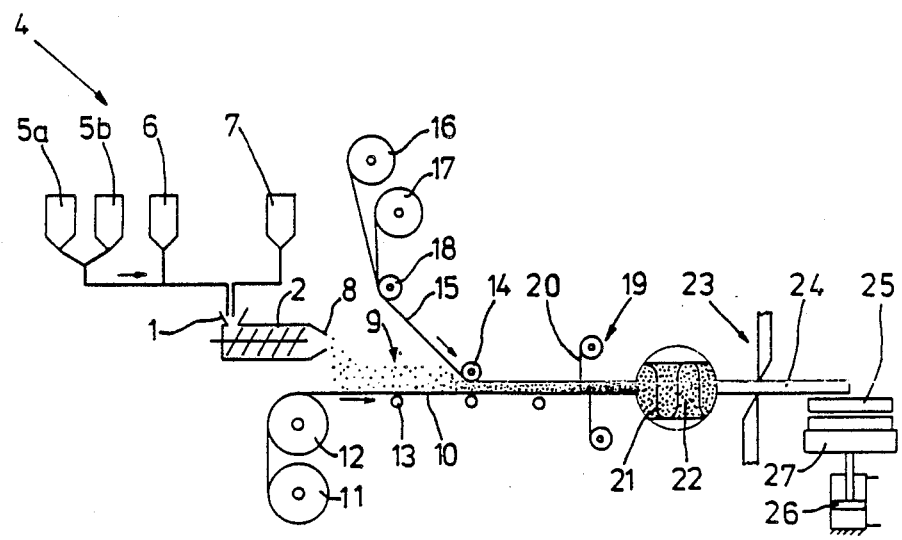

Before the semi-finished product is manufactured, the reaction resins, the elements, the reinforcing aggregates and the reinforcing material including any additional layers of non-woven webs are selected with a view to the required stability in storage and ease of handling of the semi-finished product and the thickness, weight, processing conditions, strength and appearance of the ultimate moulded product.

The two components of the reaction resin are brought together and introduced into a mixer together with any reinforcing aggregates and elements in the form of beads of changeable volume and form. In the course of the mixing process, a premix in the form of a debris material is obtained after the elements have become coated with reaction resin and optionally surrounded with reinforcing aggregates. This debris material is discharged from the outlet opening to drop on to a lower covering layer of glass fibre fabric which is drawn off a supply roll and after a change in direction on a deflecting roller is carried horizontally over supporting rollers. The debris material may be applied as one or several layers. If more than one layer is applied it may be advantageous for the purpose of increasing the strength to apply different debris materials from different mixers, possibly with interposition of intermediate layers of reinforcing material. The debris material is covered with an upper covering layer, for example a layer of glass fabric for reinforcement and loose non-woven web for increasing the thickness of the covering layer in the finished product. The debris material may be compacted by vibration, optionally under a vacuum. The material is then shaped by means of a calibrating roller which may be profiled or smooth according to the required dimensions of the semi-finished product.

Finally, the composite arrangement of layers is fixed, for example by quilt stitching to produce a mattress finish or by stitching with flexible filaments or threads. The fixed semi-finished product is then either used directly to produce the finished product or first cut up into boards and temporarily stored.

To produce the finished product, the semi-finished product is cut to size and shape and introduced into a heated mould at temperatures of from 50 to 180° C., in particular from 80 to 120° C., whereby the viscosity of the reaction resin is reduced and the rigid bond in the debris material is therefore also reduced. When the rams of the press are moved towards each other, the dry adaptable covering layers slide against the contours of the mould and the elements move in relation to one another until the whole mould is filled. A 2- to 6-fold, in particular 3- to 4-fold compression now takes place under a pressure of <10 bar and part of the reaction resin flows into the covering layers under the resulting pressure gradient to form a smooth, continuous, reinforced outer layer while the remaining part gives rise to a rounded pore structure. Curing takes place within a few minutes, depending on the reaction resin and the temperature, and may be accelerated by the application of a high frequency field or under the influence of a gas in the elements.

EXAMPLE

A semi-finished product is produced by the process described above from the following formulations:

| No. | Core layer EPS/EP/GF (g) | Covering layer Glass fabric/Glass mat (g/m$^2$) |
|---|---|---|
| 1 | 150/250/50 | 70 |
| 2 | 150/500/100 | 450 |
| 3 | 150/500/100 | 1000 |
| 4 | 150/750/150 | 1000 |

After the semi-finished product has been cut to size and shape it is introduced into a heated mould to produce sample plates which are subjected to a preliminary pressure of <10 bar. After the moulding process, the semi-finished product undergoes a 4-fold compression which causes the displaced resin to flow in the direction of the covering layers with which it combines to form a reinforced resin layer. Subsequent curing proceeds from the surface of the mould toward the centre of the core at temperatures in the region of 80° C. After a residence time in the mould of from 5 to 15 minutes, a rigid product is obtained which has a hollow spherical cell structure in the core and cell walls which are reinforced by the admixture of reinforcing aggregates.

Bending tests with linear introduction of force were carried out on test plates measuring 400×400×17 mm and the following breaking strengths and rigidities were found:

| Sample No. | RG g/cm$^3$ | Breaking strength KN | Deformation mm | Rigidity N/mm |
|---|---|---|---|---|
| 1 | 0.26 | 3.75 | 9.0 | 462 |
| 2 | 0.41 | 7.90 | 12.1 | 800 |
| 3 | 0.5 | 10.00 | 14.0 | 922 |

Under alternating stresses of more than 60% of the short term breaking loads, the test plates showed no damage after $10^6$ LW:

| Sample No. | RG g/cm$^3$ | Maximum force KN | Deformation mm | Stress cycles |
|---|---|---|---|---|
| 2 | 0.35 | 4 | 4.1 | $10^6$ |
| 3 | 0.41 | 4 | 3.0 | $10^6$ |

-continued

| Sample No. | RG g/cm³ | Maximum force KN | Deformation mm | Stress cycles |
| --- | --- | --- | --- | --- |
| 4 | 0.5 | 4 | 3.0 | $10^6$ |

I claim:

1. A post forming semi-finished product having sheet like dimensions for producing rigid molded parts by applying heat and compression of 1:2 to 1:6, the semi-finished product having flexible covering layers with a resin containing core between the layers, the covering layers comprising dry reinforcing mats having open spaces therein which extend in the direction of the core, the core including fixed debris material of individual three dimensional elements changeable in volume or form embedded in an uncured and storage stable resin, and the open spaces in the dry reinforcing mats being constructed and arranged to fill with the uncured and storage stable resin when the semi-finished product is post formed by application of heat and compression of 1:2 to 1:6.

2. A post forming semi-finished product as in claim 1 including spacers in the form of bridges of reaction resins bonding the covering layers together.

3. A post forming semi-finished product as in claim 1 including spacers in the form of external shrink film holding the covering layers together.

4. A post forming semi-finished product as in claim 1 including spacers in the form of flexible connections bonding the covering layers together.

5. A post forming semi-finished product as in claim 1 wherein the covering layers include slidable material on the external surfaces thereof.

6. A post forming semi-finished product as in claim 1 wherein the debris material includes plural regions of at least partially differing three-dimensional elements.

7. A post forming semi-finished product as in claim 1 wherein the uncured and storage stable resin has a structural viscosity of $\leq 20,000$ mPa.s within a temperature range of 50 to 80° C.

* * * * *